(No Model.) 2 Sheets—Sheet 2.
M. W. BEARD.
CULTIVATOR.
No. 522,957. Patented July 17, 1894.
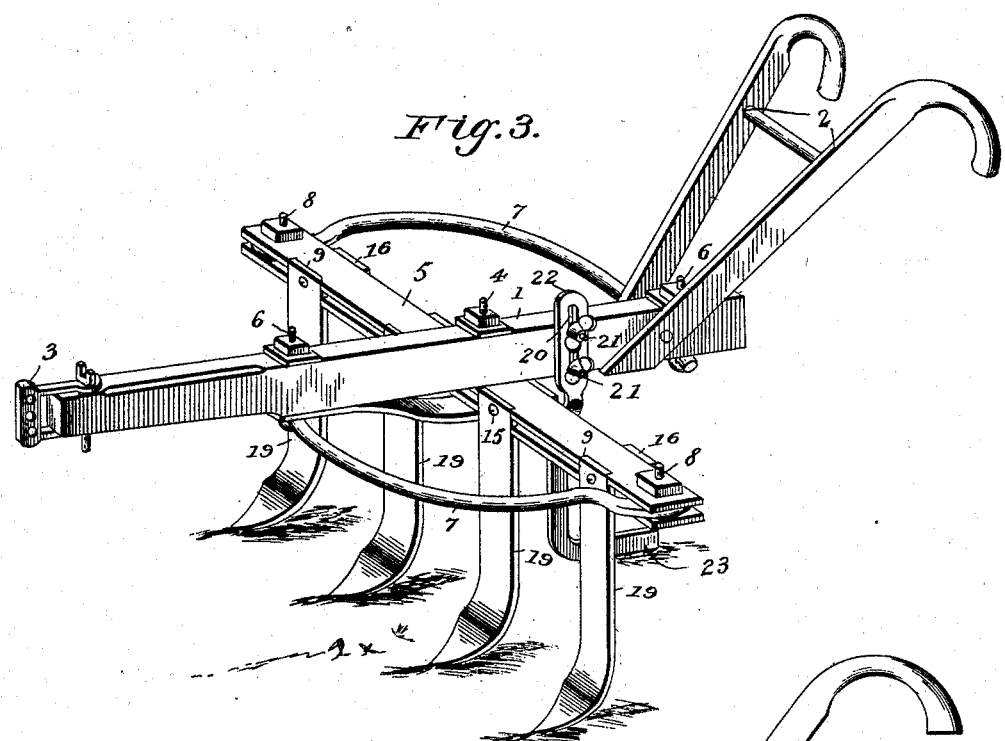
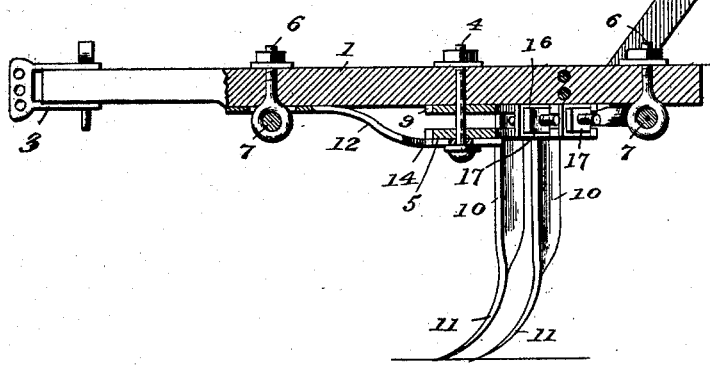
Witnesses
Julius Ulke Jr
W. S. Duvall
Inventor
Murray W. Beard,
By his Attorneys.
C. A. Snow & Co.

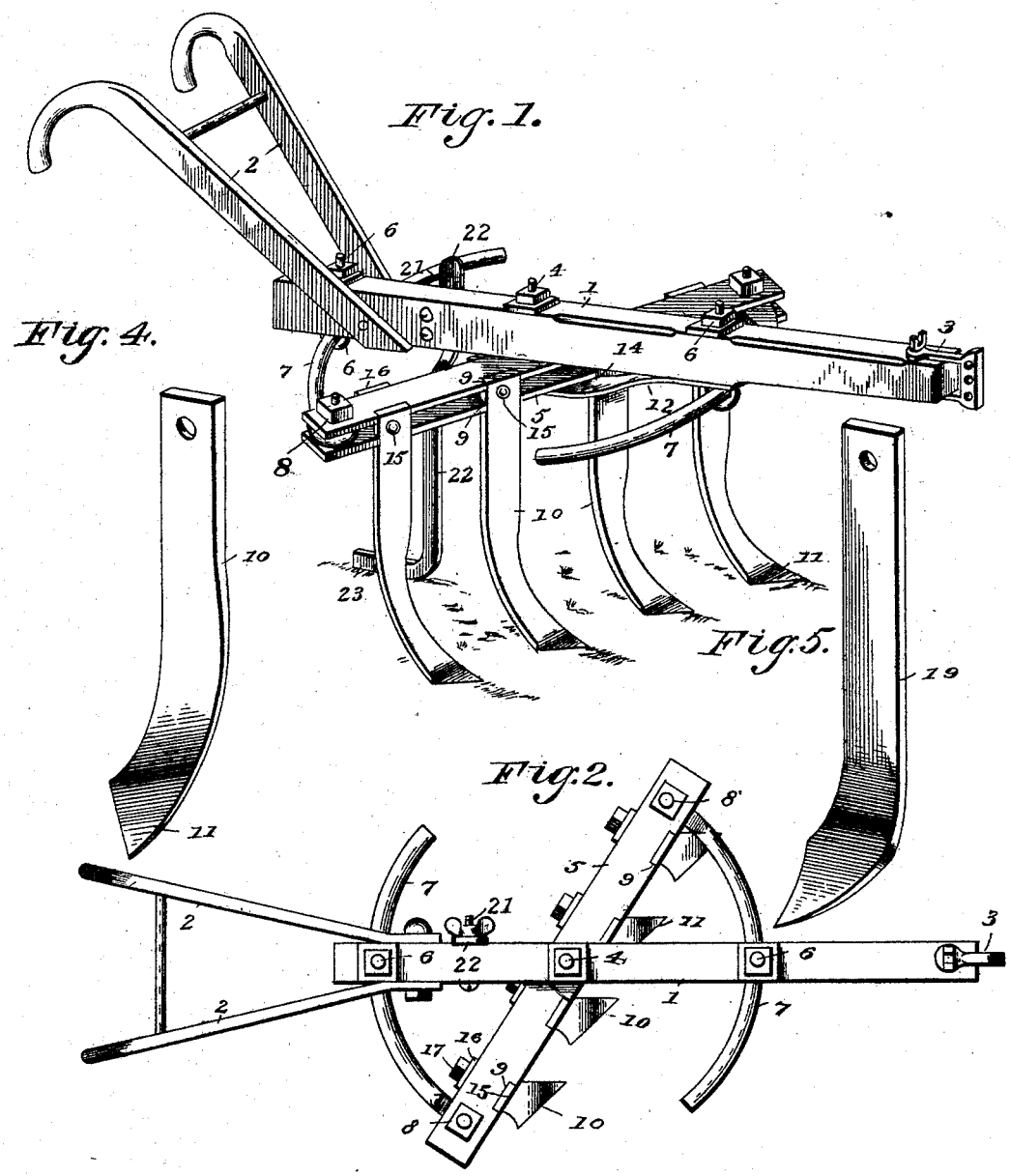

UNITED STATES PATENT OFFICE.

MURRAY WILLIE BEARD, OF TOPISAW, MISSISSIPPI.

CULTIVATOR.

SPECIFICATION forming part of Letters Patent No. 522,957, dated July 17, 1894.

Application filed November 20, 1893. Serial No. 491,451. (No model.)

*To all whom it may concern:*

Be it known that I, MURRAY WILLIE BEARD, a citizen of the United States, residing at Topisaw, in the county of Pike and State of Mississippi, have invented a new and useful Cultivator, of which the following is a specification.

My invention relates to improvements in cultivators, and to that particular class thereof embodying a transverse cultivator-bar pivoted to the beam and capable of being swung or oscillated so as to be converted from a T-shaped cultivator to what is commonly known as a side-cultivator.

The objects of my invention are to produce a simple construction of this class of inventions adapting the same for either use as above stated, capable of easy adjustment, is strong and durable, and which will not collect trash during its travel over the field.

Various other objects and advantages of the invention will appear in the following description and the novel features thereof will be particularly pointed out in the claim.

Referring to the drawings:—Figure 1 is a perspective view of a cultivator constructed in accordance with my invention, the same being shown as a side-cultivator or harrow. Fig. 2 is a top plan view thereof. Fig. 3 is a perspective view, the machine being in the position to serve as a T-shaped cultivator. Fig. 4 is a detail of the tooth employed with the parts arranged as in Figs. 1 and 2. Fig. 5 is a similar view of the tooth employed, the parts arranged as in Fig. 3. Fig. 6 is a vertical longitudinal sectional view through the cultivator-bar and the beam.

Like numerals of reference indicate like parts in all the figures of the drawings.

In practicing my invention I employ the usual longitudinal beam 1, and secure to the rear end thereof in any suitable manner handles 2 and to the front end a draft device 3. I pass vertically through the beam between its ends and preferably in rear of its center a pivoting-bolt 4, the bolt also passing through a pair of parallel cultivator bars 5. Eye-bolts 6 are passed through the beam vertically in front and in rear of the bolt 4, and curved guide-rods 7 are loosely mounted in the eye-bolts 6 below the beam and have their opposite ends pivotally connected by bolts 8 at points between the extremities of the bars 5. The bars 5 are provided at their front edges with vertically opposite notches 9 and seated in the notches or seats thus produced is a series of harrow or cultivator teeth 10, as shown in Figs. 1, 2 and 4. They are when employed in a side harrow or cultivator given a slight twist in their shanks so as to produce a shear-like blade 11 at their lower ends. By this arrangement I avoid the objection to this class of teeth, namely the collection of trash during the travel of the machine over the field and a consequent choking and impediment to the machine.

Secured to the lower end of the bolt 4 is an inclined brace 12, the front end of said brace being upwardly disposed and perforated for the reception of the front eye-bolt 6, the eye of said bolt extending below the brace. This brace is notched at one edge as indicated at 14 and the same receives one end of the shank of one of the teeth, whereby the cultivator-bar may be swung to the proper angle with relation to the beam and the line of draft. The under side of the brace 12 also serves as a wear-plate for the wooden beam 1 and prevents chafing of the same by the movements thereunder of the front curved guide-rod 7.

Through each of the teeth 10 there is passed a bolt 15, the same being located between the bars 5 and at their rear ends being threaded and passed through plates 16 which take against the rear edges of the bars. Threaded upon the rear ends of these bolts are binding-nuts 17, whereby the shanks are held securely in the seats 9. I have illustrated the machine as in position to serve as a side-cultivator or harrow in Figs. 1 and 2 of the drawings, and it will be seen that I therein employ the teeth mentioned.

In Fig. 3 I have illustrated the machine as arranged to serve as a T-shaped harrow, and in order to secure this arrangement the nuts on the upper ends of the eye-bolts 6 are loosened and the guide-rods 7 reciprocated through the eye-bolts, and the bars 5 oscillated until they assume a position at a right angle to the beam 1. I then remove the harrow-teeth 10 and substitute for them the curved V-shaped flat teeth 19 illustrated in Fig. 5 of the drawings.

I prefer to employ a landside or gage for gaging the depth of penetration of the teeth in the soil, and for this purpose provide one side of the beam in rear of the bars 5 with a pair of nutted studs 20. These studs extend from a vertical slot 21 formed in a standard 22 whose lower end is deflected rearward to form a guide-foot 23. It will be obvious that this landside may be raised and lowered, and that the penetration of the harrow or cultivator-teeth will depend upon its position with relation to the beam 1.

The use of the machine or rather its operation is too well known to require specific description, and it is simply necessary to state that the operator follows the machine in the usual manner as the same is drawn through the field, the teeth performing the function of pulverizing and stirring-up the soil and providing for the reception of the seed.

The terminal eyes of the guide-rods form the means for spacing the upper and lower bars of which the pivotal arm is constructed, thereby avoiding the necessity of auxiliary devices for this purpose, and when it is desired, for any reason to detach all of the cultivator teeth from said arm it may be accomplished by removing the bolts 8 and thus allowing the bars 9 to be separated after the pivot-bolt is loosened. I prefer this particular form of connection between the tooth-carrying arm and the guide-rods for another reason, namely, that it involves a pivotal connection of said rods, whereby any irregularities in the movements of the parts do not produce the binding action liable to result if the rods are rigidly connected to the terminals of the arm. And by employing a separate guide-rod for each end, the arm is held securely and great freedom of movement is possible. The arrangement of the bars 9 one above the other in parallel horizontal planes, I attain the necessary strength of the arm and at the same time produce a light structure which is especially desirable in devices of this class. Thus, in the construction illustrated in the accompanying drawings I have combined lightness, strength, the necessary flexibility to prevent straining, and detachability, by a specific arrangement of pivotal tooth carrying arm, comprising spaced parallel bars arranged one above the other so as to dispose their edges in the line or plane of strain, and held at the desired intervals by the eyes of independent guide-arms, which are thus pivoted to the terminals of the arm. By extending the guide-arms respectively in front and in rear of the arm, I secure front and rear braces for the arm without employing a continuous or circular guide, and thus materially reduce the cost of manufacture and increase the facility of detachment of the parts for the purpose of repair, &c.

It will be seen that my invention is very simple in its construction, comprising few parts that are readily fitted to each other and replaced when broken, and that the adjustment from a T-shaped cultivator or harrow to a side cultivator or harrow may be readily secured by loosening the nuts on the upper ends of the eye-bolts 6 and swinging the bars 5 to a desired angle.

I do not limit my invention to the precise details of construction herein shown and described, but hold that I may vary the same to any degree and extent within the knowledge of the skilled mechanic.

Having described my invention, what I claim is—

In a device of the class described, the combination with a beam provided with front and rear pendent eye-bolts, of an arm pivoted centrally to the under side of said beam midway between the eye-bolts and comprising upper and lower parallel spaced bars, vertical bolts connecting the extremities of said bars, horizontal curved guide rods provided with terminal integral eyes which are fitted upon said vertical bolts between the planes of the spaced bars and fitted slidably at their opposite ends in the said pendent eye-bolts, whereby the rods are pivoted to the ends of the arm and the said terminal eyes maintain the bars at the proper interval, and cultivator teeth secured to and carried by the arm, substantially as specified.

In testimony that I claim the foregoing as my own I have hereto affixed my signature in the presence of two witnesses.

MURRAY WILLIE BEARD.

Witnesses:
C. ATKINSON,
EUGENE ATKINSON.